US008706091B2

(12) United States Patent
Baird

(10) Patent No.: US 8,706,091 B2
(45) Date of Patent: Apr. 22, 2014

(54) ATTACHMENT OF RICH CONTENT TO A UNIFIED MESSAGE LEFT AS A VOICEMAIL

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1831 days.

(21) Appl. No.: 11/726,899

(22) Filed: Mar. 23, 2007

(65) Prior Publication Data

US 2008/0232557 A1 Sep. 25, 2008

(51) Int. Cl.
| G06F 15/16 | (2006.01) |
| H04M 11/10 | (2006.01) |
| H04L 29/08 | (2006.01) |
| H04W 4/00 | (2009.01) |

(52) U.S. Cl.
USPC ............... 455/413; 379/88.18; 379/93.01; 379/68; 379/69; 379/71; 379/76; 379/88.27; 379/67.1; 379/88.13; 379/88.17; 455/414.4; 455/466; 709/206; 709/207; 709/211

(58) Field of Classification Search
USPC ........ 379/88.18, 93.01, 68, 69, 71, 76, 88.27, 379/67.1, 88.13, 88.17; 455/413, 414.4, 455/466; 709/206, 207, 211
See application file for complete search history.

(56) References Cited

U.S. PATENT DOCUMENTS

| 4,993,022 | A | 2/1991 | Kondo et al. |
| 5,729,687 | A | 3/1998 | Rothrock et al. |
| 5,983,192 | A | 11/1999 | Botzko et al. |
| 6,009,519 | A | 12/1999 | Jones et al. |
| 6,014,427 | A | 1/2000 | Hanson et al. |
| 6,236,854 | B1 | 5/2001 | Bradshaw, Jr. |
| 6,259,405 | B1 | 7/2001 | Stewart et al. |
| 6,342,903 | B1 | 1/2002 | Fado et al. |
| 6,501,739 | B1 | 12/2002 | Cohen |
| 6,532,230 | B1 * | 3/2003 | Lung et al. ................. 370/352 |
| 6,545,596 | B1 | 4/2003 | Moon |
| 6,590,604 | B1 | 7/2003 | Tucker et al. |
| 6,608,820 | B1 | 8/2003 | Bradshaw, Jr. |
| 6,629,130 | B2 * | 9/2003 | Mertama et al. ............ 709/206 |
| 6,671,262 | B1 | 12/2003 | Kung et al. |
| 6,697,458 | B1 * | 2/2004 | Kunjibettu ................. 379/88.17 |
| 6,792,085 | B1 * | 9/2004 | Rigaldies et al. .......... 379/88.13 |
| 6,816,469 | B1 | 11/2004 | Kung et al. |
| 6,834,100 | B2 * | 12/2004 | Reynolds .................. 379/88.16 |
| 6,865,540 | B1 | 3/2005 | Faber et al. |
| 6,871,217 | B2 * | 3/2005 | Voticky et al. ............... 709/207 |
| 6,876,734 | B1 | 4/2005 | Summers et al. |
| 6,885,900 | B1 | 4/2005 | Rybicki et al. |

(Continued)

OTHER PUBLICATIONS

Greg Vaundreuil Lucent Technologies Glenn Parsons Nortel Networks:"Voice Profile for Internet Mail—version 3; draft-ema-vpimv3-00.txt", IETF Standart-Working-Draft, Internet Engineering Task Force, IETF, CH, Feb. 1, 1992, 47 pages.

*Primary Examiner* — Lisa Hashem
(74) *Attorney, Agent, or Firm* — Baker Botts L.L.P.

(57) ABSTRACT

A method in one embodiment includes storing a voicemail message in a mailbox of a recipient, the voicemail message being left by a sender, and then electronically receiving one or more attachments from the sender. The one or more attachments are stored as content associated with the voicemail message. Upon accessing the mailbox, the voicemail message and the one or more attachments are provided to the recipient. It is submitted with the understanding that it will not be used to interpret or limit the scope or meaning of the claims. 37 CFR 1.72(b).

19 Claims, 4 Drawing Sheets

(56) References Cited

U.S. PATENT DOCUMENTS

| | | |
|---|---|---|
| 6,905,414 B2 | 6/2005 | Danieli et al. |
| 6,909,778 B2 | 6/2005 | Wengrovitz |
| 6,931,001 B2 | 8/2005 | Deng |
| 6,931,113 B2 | 8/2005 | Ortel |
| 6,970,908 B1 * | 11/2005 | Larky et al. ............... 709/206 |
| 6,985,745 B2 | 1/2006 | Quaid |
| 6,987,744 B2 | 1/2006 | Harrington et al. |
| 7,007,066 B1 * | 2/2006 | Malik ...................... 709/206 |
| 7,212,614 B1 * | 5/2007 | Burg et al ................ 379/88.18 |
| 7,466,803 B2 * | 12/2008 | Burg et al. ............... 379/88.18 |
| 7,599,476 B2 * | 10/2009 | Pantana et al. ............ 379/88.13 |
| 7,899,161 B2 * | 3/2011 | Katkam et al. ............ 379/88.13 |
| 7,995,716 B2 * | 8/2011 | Narang et al. ............ 379/88.13 |
| 8,085,908 B2 * | 12/2011 | Burg et al. ............... 379/88.18 |
| 8,340,646 B2 * | 12/2012 | Wang et al. ................ 455/413 |
| 8,477,913 B2 * | 7/2013 | Wang et al. ............... 379/88.11 |
| 8,494,125 B2 * | 7/2013 | Burg et al. ............... 379/88.13 |
| 2002/0124057 A1 | 9/2002 | Besprosvan |
| 2002/0194279 A1 * | 12/2002 | Chern ...................... 709/206 |
| 2004/0019560 A1 * | 1/2004 | Evans et al. ................ 705/40 |
| 2004/0086095 A1 | 5/2004 | Dixit |
| 2004/0162747 A1 | 8/2004 | Yeh et al. |
| 2004/0234046 A1 | 11/2004 | Skladman et al. |
| 2005/0108335 A1 * | 5/2005 | Naick et al. ............... 709/206 |
| 2005/0135383 A1 | 6/2005 | Shenefiel |
| 2005/0157708 A1 | 7/2005 | Chun |
| 2005/0177622 A1 | 8/2005 | Spielman et al. |
| 2005/0210112 A1 | 9/2005 | Clement et al. |
| 2005/0262208 A1 | 11/2005 | Haviv et al. |
| 2006/0078120 A1 | 4/2006 | Mahendran et al. |
| 2006/0122835 A1 | 6/2006 | Huart et al. |
| 2006/0146735 A1 | 7/2006 | Shaffer et al. |
| 2008/0189379 A1 * | 8/2008 | Naick et al. ............... 709/206 |
| 2013/0251123 A1 * | 9/2013 | Tirunagari et al. ......... 379/88.22 |
| 2013/0275882 A1 * | 10/2013 | Vuong ...................... 715/752 |

\* cited by examiner

US 8,706,091 B2

ATTACHMENT OF RICH CONTENT TO A UNIFIED MESSAGE LEFT AS A VOICEMAIL

FIELD OF THE INVENTION

The present disclosure relates generally to the field of electronic messaging, including voice messaging, over telephony networks.

BACKGROUND OF THE INVENTION

Voice messaging systems that enable users to send and retrieve voice mail messages are known in the communication arts. In a typical prior art voice messaging system a telephone is connected to a private branch exchange (PBX) that may utilize a notification mechanism, such as a message waiting indicator light, to notify a message recipient that a new message is waiting for them. Many wireless telephone communication systems also provide a Short Message Services (SMS) feature that allows users to send and/or receive short text messages. Today, many modern communication systems provide messaging services via packet-based networks, i.e., those that operate in accordance with the Internet Protocol (IP). A unified messaging (UM) system handles voice, facsimile, regular text messages, and computer-readable documents as objects in a single mailbox that a user can access either with a regular email client, or by telephone. A UM system typically connects to a PBX to provide automated attendant, audiotext, and voice mail services to subscribers or users. For instance, a personal computer (PC) user with multimedia capabilities typically can open and playback voice messages, either as speech or text. Unified messaging is therefore particularly convenient for mobile business users because it allows them to reach colleagues and customers through a PC or telephone device, whichever happens to be available.

There are times when a caller connected to a messaging system via a voice-only channel leaves a voicemail, but also would like to attach media content such as electronic mail (email), Web pages, financial data, documents, and/or video attachments to the voicemail message. But due to the limitations of existing UM and telephony systems users are unable to attach additional rich media content (e.g., documents, media clips, Uniform Resource Locators (URLs), etc.) to a unified message that is left as a voicemail.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
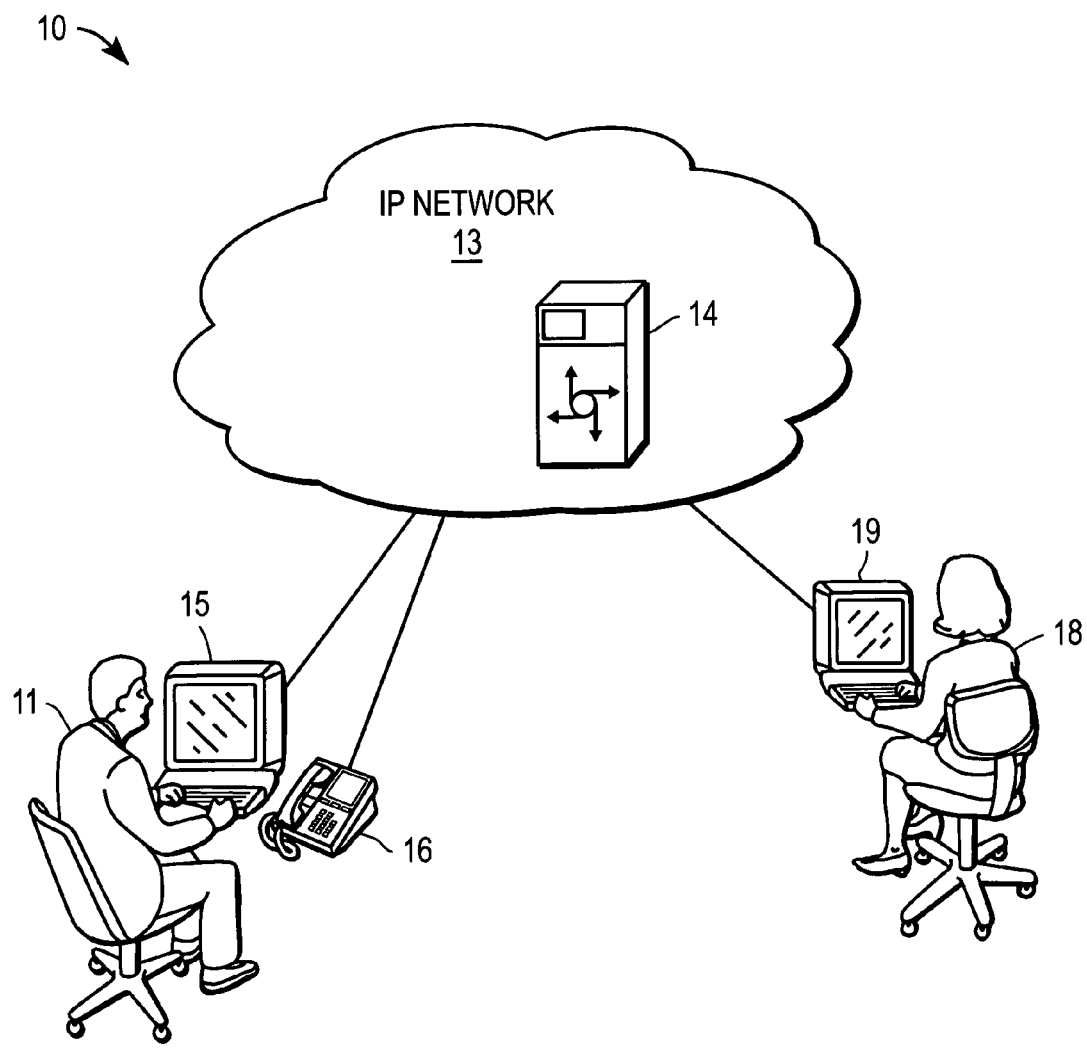
FIG. 1 example communications network with messaging capabilities.

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

It should be understood that in the context of the present application the term "email" (as a noun or verb) is broadly understood to apply both to Internet email systems, e.g., based on the Simple Mail Transfer Protocol (SMTP), and to intranet systems that allow users within an organization or enterprise to communicate with each other via electronic messages. An "email client", also called a mail user agent (MUA), is a computer program or application that is used for composing, sending, storing, and receiving of electronic messages over a communication network or system. A "voicemail" is recorded speech message stored in a computerized system for answering and routing telephone calls, for recording, saving, and relaying messages, and sometimes for paging a user.

An "voicemail system", as that term is used in the present disclosure, may refer to a single computer system or network, or more expansive systems that include gateway devices connected to other computer systems, thus enabling users to send/retrieve recorded speech messages anywhere in the world. An endpoint is any device, component, element, or object capable of sending or receiving an email message over a network. An endpoint may comprise a personal computer (PCs), workstation, personal digital assistant (PDA), laptop or notebook computer, or other messaging equipment. A Unified Messaging (or UM) system is a computerized system that integrates different streams of messages (e-mail, fax, voice, video, etc.) into a single "in-box", accessible from a variety of different endpoint devices.

According to one embodiment of the present invention, a Unified Messaging (UM) system is provided that allows a user to attach additional rich media content to a unified message left as a voicemail. A first user (i.e., a "sender") may call into a UM system on a voice-only channel, deposit a voicemail message, and later attach a Web page, for example, to the voicemail message. An Interactive Voice Response (IVR) system may be utilized to query the sender whether he wishes to attach additional, non-voice content to the voicemail message. If the sender responds affirmatively, an email message may be sent to the sender by the UM system. The email message may contain the deposited voicemail message as an attachment (so that the sender remembers what was said) and a text request to attach additional content as a reply to the email. The UM system of the various embodiments described herein recognizes emails with attached content and adds the content to the deposited voicemail. The attached content may then accessed by a second user (i.e., the "receiver") along with the voicemail message in the UM system's Graphical User Interface (GUI).

When a receiver retrieves a voicemail message with attached content, the UM system handles this message just like any other rich-media UM system message. That is, the UM system handles the voicemail and attached content as objects in a single mailbox that the receiver can access either with a regular email device (such as a personal computer, (PC), a telephone device, or other suitable endpoint device. In the event that the receiver retrieves a voicemail message before the reply with the attached content is received via email, the UM system may warn the receiver that additional content has yet to be attached and send notification to the receiver that content was subsequently attached. In this manner, the receiver is able to view the attachment once it arrives.

Referring to FIG. 1, an example communications network 10 is shown with messaging capabilities provided be a UM system or module 14 (e.g., an application or code running on a server) located on IP network 13. Individual users may send/retrieve messages to/from UM system 14 (and take responsive actions thereto) utilizing any number of different endpoint devices and communication paths. For example, users 11 and 18 calling into UM system 14 from either an office telephone 16 with a text message screen or PC 15 or 19 may connect with UM system 14 (e.g., to retrieve messages and initiate responsive actions) via IP network 13. Users 11 and 18 may also connect with UM system 14 using other types of endpoint devices that provide two-way communications with UM system 14 over one or more network connections.

UM system 14 may incorporate or be associated with a text-to-speech (TTS) converter for converting a text message to audible speech when a user connects with UM system 14 via a voice-only device. Similarly, UM system 14 may incorporate or be associated with a speech-to-text (STT) converter for converting a voice message to text for a user connected via a display-only device. Conversions from different media formats or types (e.g., speech-to-text or text-to-speech) may also be based on user preferences rather than the user interface capabilities of the dialing user's device.

Figure 2:
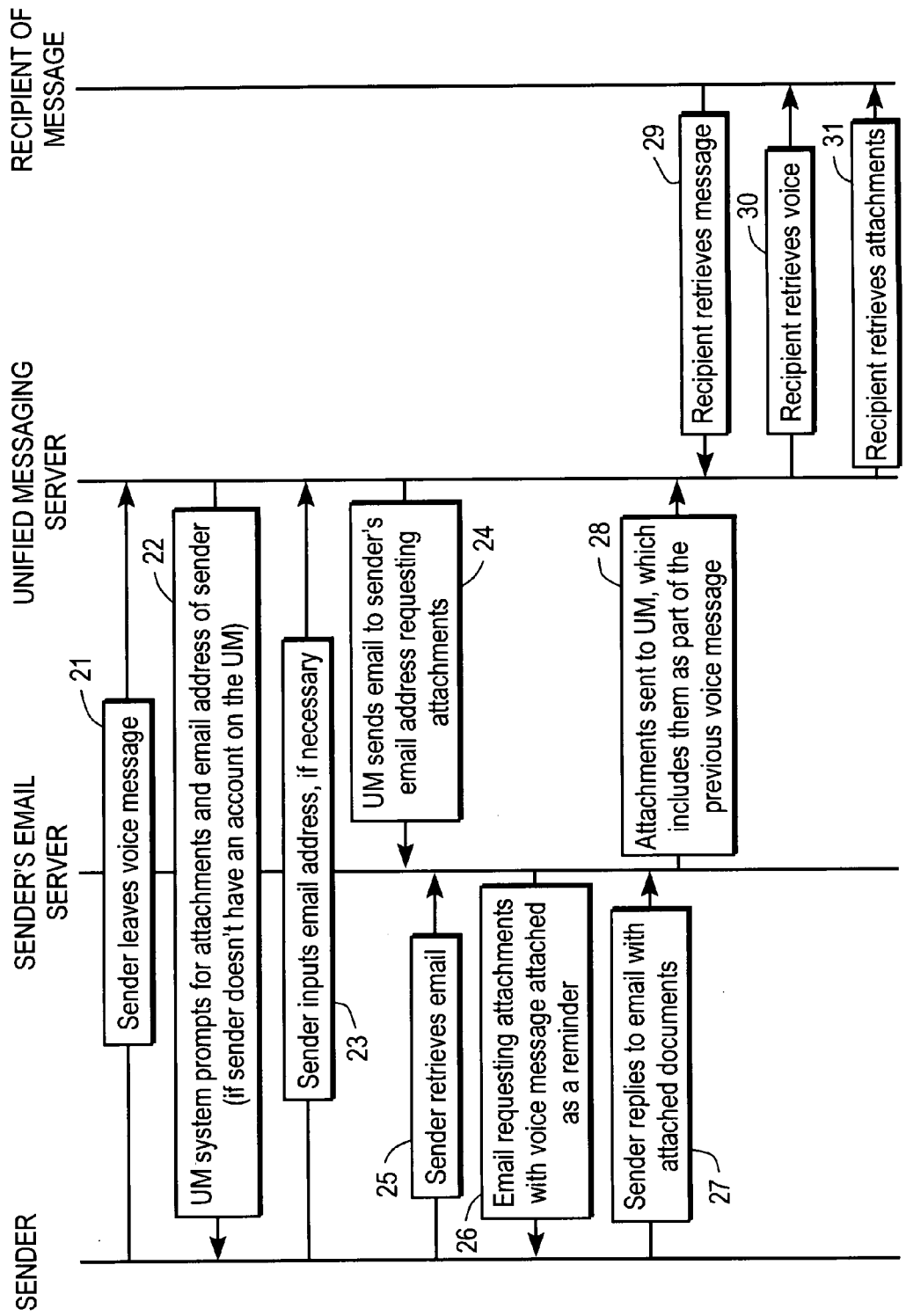
FIG. 2 illustrates an example method of operation of the communications network shown in FIG. 1.

FIG. 2 illustrates an example method of operation of the communications network shown in FIG. 1 in which a user retrieves a voicemail message with attached content using a telephone device. The process begins with the caller/sender calling into the UM system (server) on a voice-only channel. The UM system detects the voice-only call and allows the sender to deposit a voicemail message (block 21). At the end of the voicemail message, the voicemail IVR component of the UM system asks the sender whether he has any additional, non-voice content he wishes to attach to the message. If the sender says "yes" and does not have an account with the UM system, the UM system prompts for the email address of the sender, again using the IVR (block 22). For example, the IVR may state, "Please state or spell your email address after the beep." After the beep the sender may leave his email address on the voice-only channel, which may be collected by the ASR component of the UM system (block 23). In another embodiment, the sender may use a keypad or other input device to send a DTMF representation of the email text string.

Alternatively, if the sender wishes to attach additional, non-voice content to the voicemail message and the sender has an account with the UM system, it is unnecessary to obtain the sender's email address because it is already stored in a directory of the UM system. In this scenario, the UM system may look up the email address of the sender simply using caller identification information. If the sender does not wish to attach additional content to the voicemail message, (e.g., if he responds negatively when the IVR component of the UM system queries the sender if he would like the attach any additional, non-voice content to the voicemail message) the UM system simply notifies the recipient of the voicemail message and closes the call In the case where the caller/sender wants to attach a media file or other content to his voicemail, the UM system sends an email message to the sender's email address requesting attachments to the voicemail message. Note that this occurs after the sender has already deposited his voicemail message in the UM system and ended his call (block 24). In the example shown, the email message from the UM server to the sender's email box contains the deposited voicemail message as an attachment (to remind the sender of what he said in the voicemail message) and a text request to attach additional content as a reply to the email message. For instance, the email may state "In the voicemail message sent at 8:00 a.m. on March 3 to phone number 408-555-1111, you indicated that you wanted to attach documents to this voicemail message. Please send a reply email with these documents attached." When the sender accesses his email later on (block 25), he is able to retrieve the email message requesting that he attach documents to the voicemail message (block 26). This email request from the UM system is simply waiting in his inbox along with his other email messages.

The process continues with the sender replying to the email message with the relevant attached documents (block 27). Here, the UM system is operable to correlate the sender's response with the UM system's initial email message so that the attachments are added to the proper unified message. In one embodiment, the UM system may include a unique ID in the subject line of the email message. When the sender replies, the subject line is preserved, allowing the UM system to complete the correlation. The UM system then adds the attachments to the previous voicemail message (block 28). The attached content is now available to be displayed with the voicemail in the UM system's GUI. The recipient may retrieve the message by accessing his mailbox within the UM system any time thereafter (block 29). By accessing the UM system the recipient may now retrieve both the voicemail message (block 30) and the attachment(s) (block 31).

As stated previously, the UM system treats reply emails with attached content as regular unified messages. That is, the UM system delivers one or more rich media files to the recipient in various forms, depending on what type of device the recipient is calling in on. The recipient's different messaging systems (e.g., voice, fax, email, text, video, etc.) are consolidated in a single repository that the recipient may access using the UM system's GUI. If the recipient is accessing the voicemail message and the attached content through a personal computer connected to the Internet, for example, a STT converter may convert the speech in the voicemail message to text so that the recipient may simply read the message on his computer screen along with the attached documents. Alternatively, if the recipient is accessing the message by a dial-up call from a telephone connected to the Internet, then a TTS converter may convert the text of the attached documents into speech, so that the recipient may listen to the voicemail message and the attached documents using the handset device of the telephone.

Figure 3:
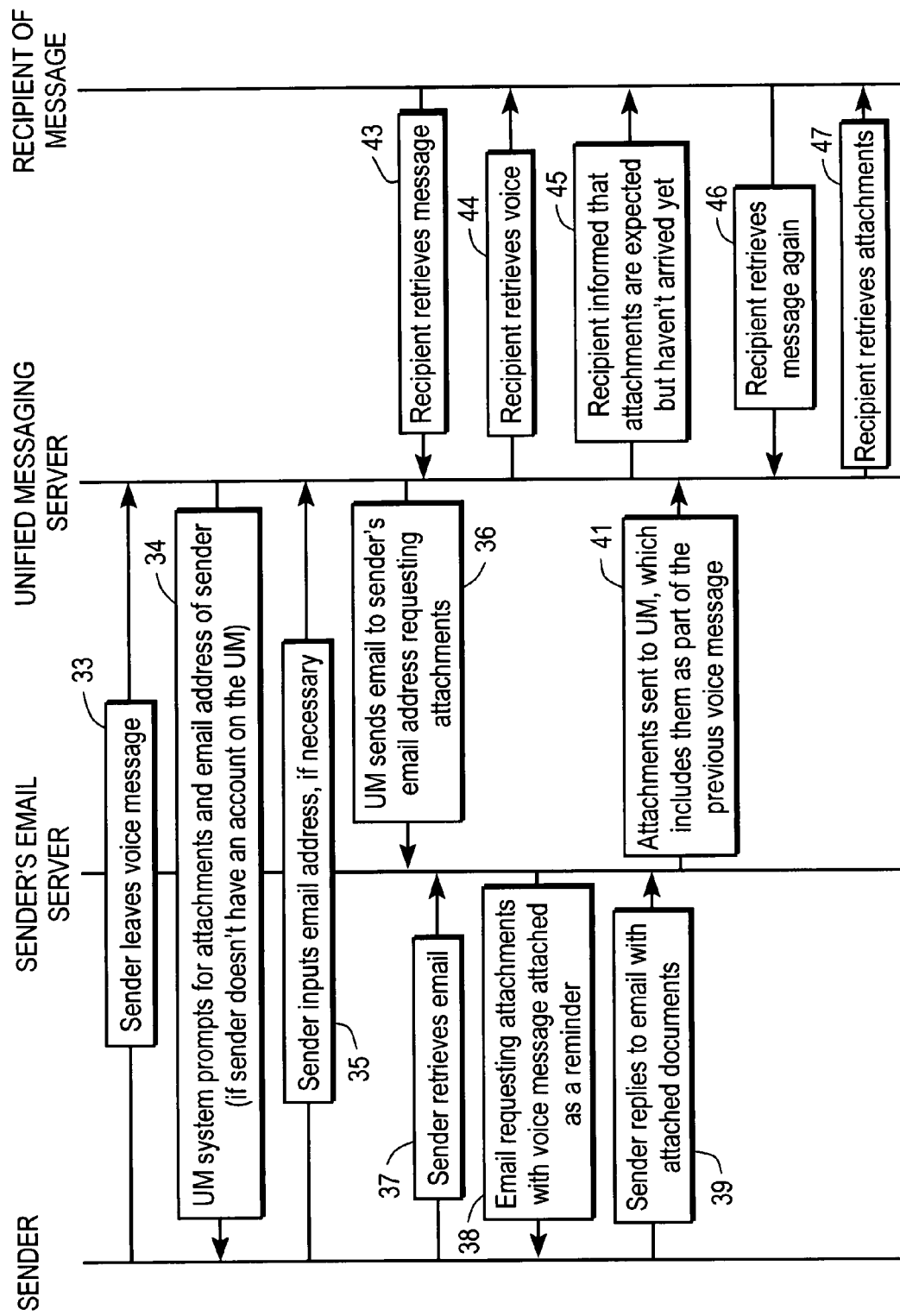
FIG. 3 illustrates another example method of operation of the communications network shown in FIG. 1.

FIG. 3 illustrates another example method of operation of the communications network shown in FIG. 1. Each of the steps 33-41 are similar to those described in FIG. 2. The difference is that in the example of FIG. 3, the recipient retrieves the voicemail message (block 43) before the UM system is able to receive the reply email from the sender with the attached documents (block 39), and also before the attached documents are included in the recipient's mailbox in association with the voicemail message (block 41). In other words, at the time that the recipient accesses his UM system mailbox, the only contents are the voicemail message previously left by the sender, without any attachments.

In block 43, the recipient requests the voicemail component of the message from the UM system, and the UM system returns the voicemail portion of the message (block 44). The UM system may inform the recipient that attachments to the voicemail message are expected but have not yet arrived (block 45). For example, if the recipient is accessing the voicemail message using the web browser of a personal computer, an email message in the recipient's inbox may state, "Please expect attached documents to the voicemail message you received on March 7 at 8:30 a.m. from phone number 408-555-1111 to arrive shortly."

The next time the recipient accesses his UM system's GUI (e.g., his web browser), the UM system may notify him that content was subsequently attached to the voicemail message (in the case, the edited documents). In one embodiment, the UM system sends the recipient an email message indicating that the attachments to the sender's voicemail are now available. For example, the email message sent to the recipient by the UM system may state, "The attached documents to the voicemail you received on March 7 at 8:30 a.m. from phone number 408-555-1111 are now available." The recipient may also be notified that the attached documents have arrived via some other mechanism, such as a page or cell phone call, depending on the type of endpoint device the recipient is using to access his messages on the UM system. Regardless of how the recipient is notified, once the attachments have been received by the UM system, and then the recipient again retrieves the voicemail component of the message (block 46), the attached documents (block 47) the attachments are now waiting in his inbox and are available for downloading, viewing, playing, etc.

Figure 4:
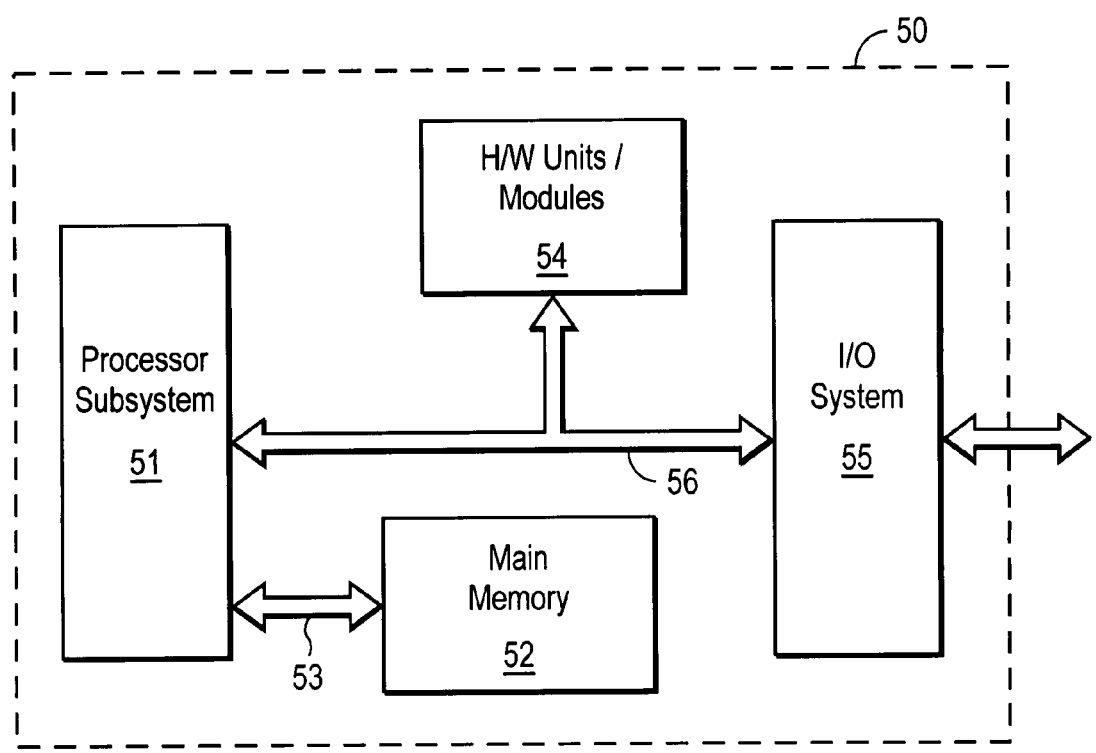
FIG. 4 illustrates an example network node or device.

FIG. 4 is a generalized block diagram showing an example network device or node 56, such as may comprise any of the systems, devices, or nodes (e.g., a PC or server) shown or described above. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated including an attached document with a voicemail message, etc.

It is appreciated that any unified messaging and/or email system utilized by or in conjunction with node 56 may comprise separate hardware devices coupled to the system bus 53, or, alternatively, implemented as software programs or modules 50 that run on one or more processors of subsystem 51. In other words, the composing, sending, storing, and receiving of electronic messages, as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, although functions and methods of various embodiments have been described as being embodied on a UM system coupled to a server via IP network, it is appreciated that these same methods and functions may be embodied on an endpoint device of a user, another server or client, a messaging application, or a third party service application program accessible via a web-based browser. Accordingly, the specification and drawings are to be regarded in an illustrative rather than a restrictive sense.

I claim:

1. A computer-implemented method of operation for a Unified Messaging System (UMS) that handles a variety of communications media, which includes voice, text messages, and compute-readable documents, as objects in a single mailbox that a recipient can access with an endpoint device, the method comprising:
   storing, in the UMS, a voicemail message in the single mailbox of the recipient, the voicemail message being left by a sender;
   prompting the sender for attachments via an email message after storing the voicemail message;
   electronically receiving, at the UMS, one or more attachments from the sender in a reply email sent by the sender to the UMS;
   storing, in the single mailbox, the one or more attachments as content associated with the voicemail message; and
   upon accessing, the single mailbox, providing the voicemail message and the one or more attachments to the recipient.

2. The computer-implemented method of claim 1 further comprising asking, via an interactive voice response (IVR) system, whether the sender wants to attach any files to the voicemail message.

3. The computer-implemented method of claim 2 further comprising prompting the sender for an email address of the sender.

4. The computer-implemented method of claim 3; further comprising sending an email message to the email address of the sender, the email message including a request for attachments and the voicemail message.

5. The computer-implemented method of claim 1 wherein the one or more attachments comprise a Uniform Resource Locator.

6. The computer-implemented method of claim 1 wherein the one or more attachments comprise a text file.

7. The computer-implemented method of claim wherein the one or more attachments comprise a computer readable file.

8. The computer implemented method of claim 1 wherein the one or more attachments comprise a video media file.

9. A computer-implemented method comprising:
   storing a voicemail message in a single mailbox of a Unified Messaging System (UMS) that handles a variety of communications media, which includes voice text messages and computer-readable documents, as objects in a single mailbox that recipient can access with an endpoint device the voicemail message being left by a sender;
   sending an email message to the sender that prompts the sender for at least one attachment to the voicemail message;
   receiving a reply to the email message from the sender that contains one or more computer-readable attachments;
   storing the one or more computer-readable attachments in the single mailbox as content associated with the voicemail message;
   retrieving the voicemail message from the single mailbox for the recipient; and
   retrieving from the single mailbox the one or more compute-readable attachments for the recipient.

10. The computer-implemented method of claim 9 further comprising, after the retrieving of the voicemail message, informing the recipient that the one or more computer-readable attachments are expected, but have yet to arrive from the sender.

11. The computer-implemented method of claim 9 wherein the retrieving of the voicemail message occurs in response to the recipient accessing the single mailbox at a first point in time, and the retrieving of the one or more computer-readable attachments occurs in response to the recipient accessing the single mailbox at a second point in time later than the first point in time.

12. The computer-implemented method of claim 9 wherein the email message includes the voicemail message.

13. The computer-implemented method of claim 9 wherein the one or More computer-readable attachments comprise a Uniform Resource Locator.

14. The computer-implemented method of claim 9 wherein the one or more computer-readable attachments comprise a text file.

15. The computer-implemented method of claim 9 wherein the one or more computer-readable attachments comprise a video media file.

16. A non-transitory machine-readable memory encoded with instructions, which, when executed, cause a computer to:
   store a voicemail message in a single mailbox of a Unified Messaging System (UMS) that handles a variety of communications media, which includes voice, text messages, and computer-readable documents, as objects in a single mailbox that a recipient can access with an endpoint device, the voicemail message being left by a sender;
   send an email message that prompts the sender for at least one attachment to the voicemail message;
   receive a reply to the email message from the sender that contains one or more computer-readable attachments;
   store the one or more computer-readable attachments in the single mailbox as content associated with the voicemail message;
   retrieve the voicemail message from the single mailbox tor the recipient; and
   retrieve from the single mailbox the one or more computer-readable attachments for the recipient.

17. The non-transitory machine-readable memory of claim 16 wherein the instructions, when executed, further cause the computer to inform, after the retrieving of the voicemail message, the recipient that the one or more compute-readable attachments are expected, but have yet to arrive from the sender.

18. The non-transitory machine-readable memory of claim 16 wherein the voicemail message is retrieved in response to the recipient accessing the single mailbox at a first point in time, and the one or more computer-readable attachments are retrieved in response to the recipient accessing the single mailbox at a second point in time later than the first point in time.

19. A system comprising:
   one or more network nodes running one or more application programs that implement a unified messaging system (UMS) that handles a variety of communications media, which includes voice text messages and computer-readable documents, as objects in a single mailbox that recipient can access with an endpoint device, the one of the nodes including:
   one or more processors; and
   a memory comprising one or more instructions executable at the processors, the one or more processors being operable, when executing the instructions, to:
      store a voicemail message in a the single mailbox of the recipient, the voicemail message being left by a sender;
      send an email message that prompts the sender for at least one attachment to the voicemail message;
      retrieve the voicemail message from the single mailbox for the recipient prior to receiving a reply from the sender to the email message;
      warn the recipient hat one or more computer-readable attachments have yet to be received as content attached to the voicemail message;
      receive the reply from the sender with the content that includes the one or more computer-readable attachments;
      store the one or more computer-readable attachments in the single mailbox;
      send a notification to the recipient that the content has been received; and
      retrieve from the single mailbox the one or more computer-readable attachments for the recipient.

\* \* \* \* \*